(12) United States Patent
Shotey et al.

(10) Patent No.: US 7,230,184 B1
(45) Date of Patent: *Jun. 12, 2007

(54) UNIVERSAL OUTLET COVER

(75) Inventors: Michael J. Shotey, Las Vegas, NV (US); Marcus J. Shotey, Scottsdale, AZ (US); George Lynn Hagen, Flagstaff, AZ (US); Kenneth C. Booth, Mesa, AZ (US)

(73) Assignee: TayMac Corporation, Gilbert, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/426,890

(22) Filed: Jun. 27, 2006

Related U.S. Application Data

(63) Continuation of application No. 11/141,520, filed on May 31, 2005, now Pat. No. 7,067,738, which is a continuation-in-part of application No. 10/966,456, filed on Oct. 15, 2004, which is a continuation-in-part of application No. 10/583,925, filed on May 25, 2004, which is a continuation of application No. 10/283,586, filed on Oct. 29, 2002, now Pat. No. 6,761,582, which is a continuation of application No. 09/351,761, filed on Oct. 11, 1999, now Pat. No. 6,511,343, which is a continuation of application No. 08/775,382, filed on Dec. 30, 1996, now Pat. No. 5,965,846.

(51) Int. Cl.
*H02G 3/14* (2006.01)

(52) U.S. Cl. .................. 174/66; 174/67; 220/241

(58) Field of Classification Search ............. 174/66, 174/67; 220/241, 242; D8/350–352; D13/143, D13/147
See application file for complete search history.

(56) References Cited

U.S. PATENT DOCUMENTS

| | | | |
|---|---|---|---|
| 1,784,277 | A | 12/1930 | Darlington |
| 1,926,001 | A | 9/1933 | Goodridge |
| D159,413 | S | 7/1950 | Hayman |
| 3,437,737 | A | 4/1969 | Wagner |
| 3,437,738 | A | 4/1969 | Wagner |
| 3,438,534 | A | 4/1969 | Zerwes |
| 3,488,428 | A | 1/1970 | Smith |
| 3,840,692 | A | 10/1974 | Wells |
| 3,928,716 | A | 12/1975 | Marrero |
| 4,312,458 | A | 1/1982 | Stewart |
| 4,774,641 | A * | 9/1988 | Rice ........................... 362/95 |
| 4,970,349 | A | 11/1990 | Jones |
| 4,972,045 | A | 11/1990 | Primeau |
| 5,003,128 | A | 3/1991 | Grondin |
| 5,017,153 | A | 5/1991 | Bowman |
| 5,165,042 | A | 11/1992 | Klinger |
| 5,180,888 | A | 1/1993 | Dierenbach et al. |
| 5,240,426 | A | 8/1993 | Barla |
| 5,285,014 | A | 2/1994 | Gilchrist |

(Continued)

*Primary Examiner*—Dhiru R. Patel
(74) *Attorney, Agent, or Firm*—Booth Udall, PLC

(57) ABSTRACT

A cover plate for hiding the socket faces of an electrical outlet. Particular embodiments of the cover plate are configured with multiple outlet configurations for use with more than one type of electrical outlet. The cover plate is mounted over the receptacle and has apertures for plug blades or thin, puncturable films over the apertures for the plug blades. Particular embodiments of the invention include thickness around the plug blade apertures for receiving plug blades of not more than 0.075 inches between the socket face and the front surface of the cover plate.

20 Claims, 5 Drawing Sheets

U.S. PATENT DOCUMENTS

| | | |
|---|---|---|
| 5,342,995 A | 8/1994 | Comerci et al. |
| 5,763,831 A | 6/1998 | Shotey et al. |
| 5,835,980 A | 11/1998 | Houssian |
| 5,965,846 A | 10/1999 | Shotey et al. |
| 6,160,219 A | 12/2000 | Maltby et al. |
| 6,441,307 B1 | 8/2002 | Shotey et al. |
| 6,511,343 B1 | 1/2003 | Shotey et al. |
| 6,642,453 B2 | 11/2003 | Shotey et al. |
| 6,723,922 B1 | 4/2004 | Shotey et al. |
| 6,761,582 B1 | 7/2004 | Shotey et al. |
| 7,067,738 B1 * | 6/2006 | Shotey et al. .................. 174/66 |

* cited by examiner

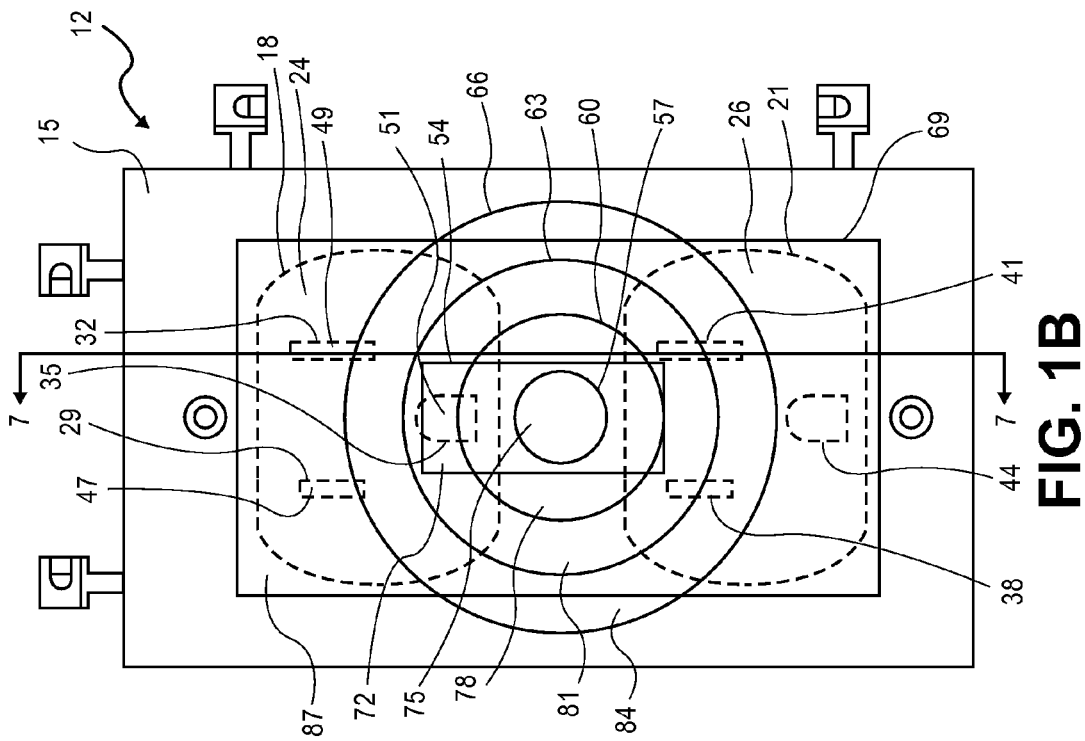
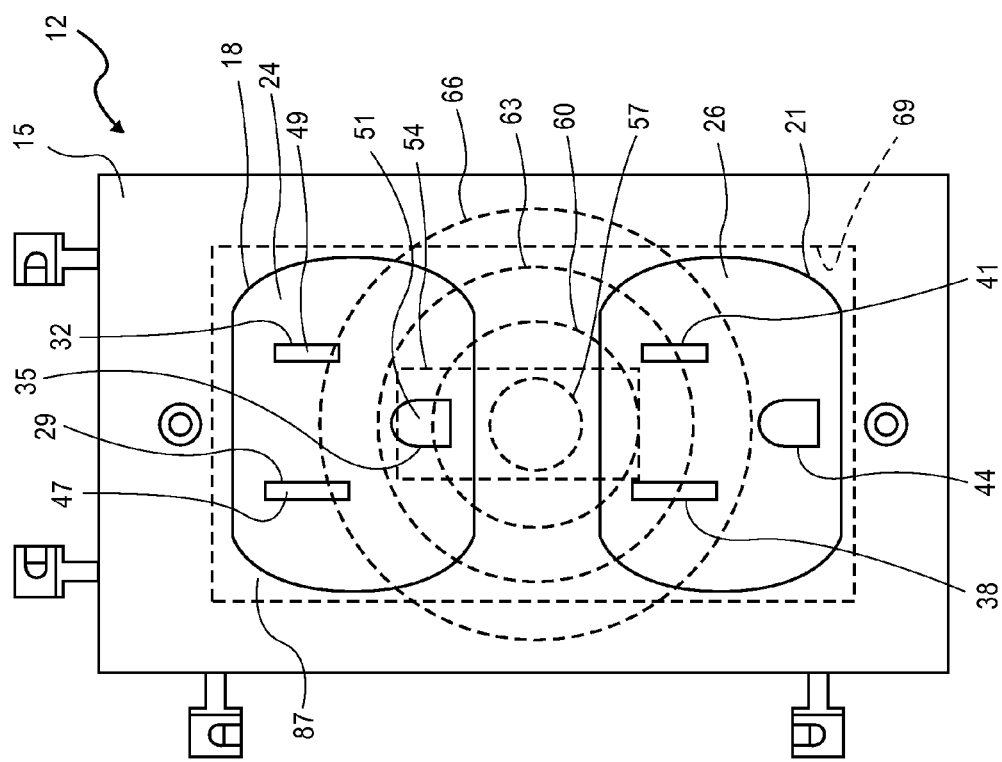

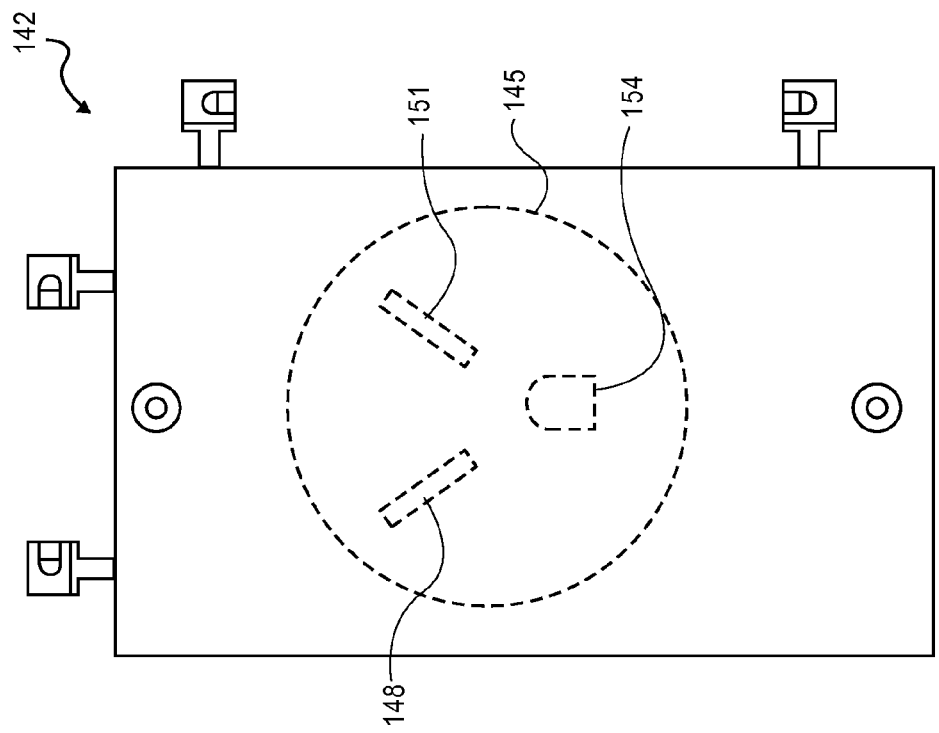
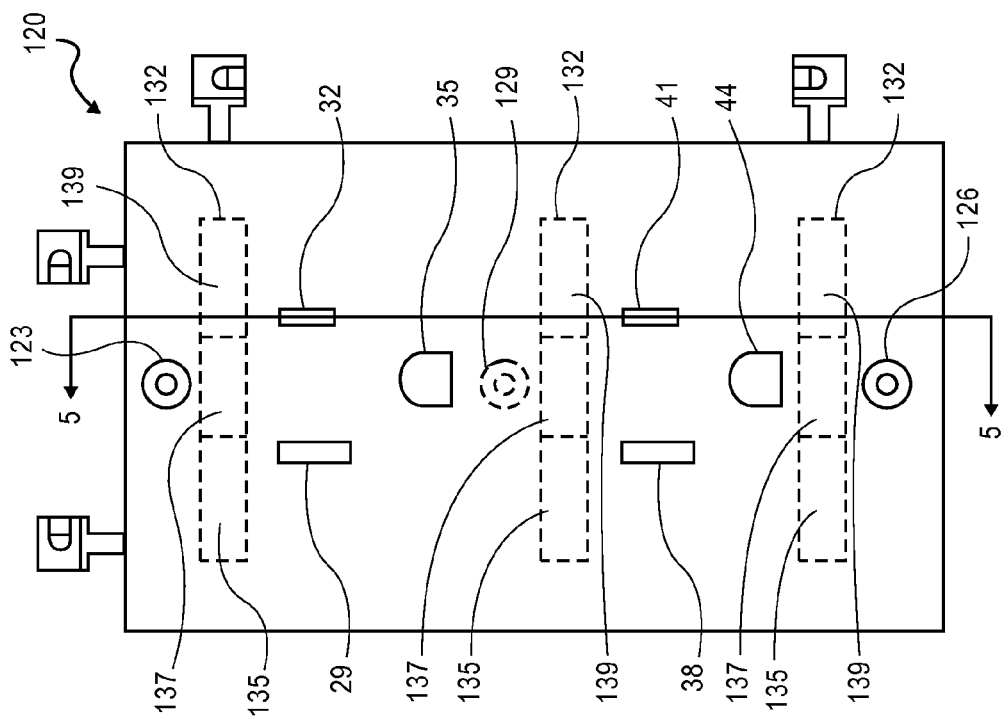
FIG. 4
FIG. 3

UNIVERSAL OUTLET COVER

CROSS REFERENCE TO RELATED APPLICATIONS

The present application also claims priority as a continuation application to patent application by Shotey et al. entitled "UNIVERSAL OUTLET COVER", Ser. No. 11/141,520, filed on May 31, 2005, presently pending which will issue on Jun. 27, 2006 as U.S. Pat. No. 7,067,738, which application is a continuation-in-part application to patent application by Shotey, et al. entitled "RECEPTACLE-MOUNTED COVER PLATE TO HIDE ELECTRICAL SOCKET FACE," Ser. No. 10/966,456, filed on Oct. 15, 2004, which is a continuation-in-part of patent application by Shotey, et al. entitled "RECEPTACLE-MOUNTED COVER PLATE TO HIDE ELECTRICAL SOCKET FACE," Ser. No. 10/583,925, filed on May 25, 2004, which is a continuation of patent application by Shotey, et al. entitled "RECEPTACLE-MOUNTED COVER PLATE TO HIDE ELECTRICAL SOCKET FACE", Ser. No. 10/283,586, filed Oct. 29, 2002 and issued on Jul. 13, 2004 as U.S. Pat. No. 6,761,582, which is a continuation of patent application by Shotey et al. entitled "RECEPTACLE-MOUNTED COVER PLATE TO HIDE ELECTRICAL SOCKET FACE", Ser. No. 09/351,761, filed Oct. 11, 1999 and issued on Jan. 28, 2003 as U.S. Pat. No. 6,511,343, which is a continuation of patent application by Shotey, et al. entitled "RECEPTACLE-MOUNTED COVER PLATE TO HIDE ELECTRICAL SOCKET FACE," Ser. No. 08/775,382, filed Dec. 30, 1996 and issued on Oct. 12, 1999 as U.S. Pat. No. 5,965,846, the disclosures of which are hereby incorporated herein by reference.

BACKGROUND OF THE INVENTION

1. Technical Field

The present invention relates generally to outlet cover plates, and specifically to universal outlet cover plates that cover the socket face of an electrical outlet and is adaptable for use with multiple electrical outlet configurations using the same cover plate.

2. Background Art

In commercial stores, reducing the number of products on the store shelves is a concern. A fewer number of different products (and their SKUs) makes management of inventory and sale easier. In an effort to reduce the number of SKUs for in-use or weatherproof electrical outlets, bases with knock-out sections have been used that allow a portion of the cover plate to be removed to allow a particular configuration of a socket face to extend through the plate. Two examples of this are shown and described in U.S. Pat. Nos. 5,763,831 and 6,441,307, both to Shotey, et al. As an alternative to a cover plate with the removable sections built into the plate, similarly configured adapters have been used with "while-in-use" bases, wherein the adapter plate includes one or more removable sections to allow for configuration of the base to fit different configurations of socket faces. An example of this is shown in U.S. Pat. No. 6,642,453 to Shotey et al.

Conventional electrical outlet systems are made of several components, including a wall box and a receptacle that is typically composed of pairs of sockets and a yoke. The receptacle is typically attached to the wall box which is attached to a framing member inside the wall. The receptacle is accessible through a hole cut in the wall. A cover plate having apertures to allow the sockets to protrude is installed over these components, typically with one or two screws. A conventional cover plate may be adapted with one or more hinge members along one or more sides to act as a base for a cover for in-use applications. Electrical devices are plugged in by inserting the plug blades through aligned apertures in the cover plate and socket.

A cover plate is installed after construction. It is common practice to remove the cover plate during remodeling or redecorating so that it does not become damaged or defaced with paint drips and splatters, wallpaper paste, or other decorating materials. The conventional cover plate is easily removed by unscrewing the screw or screws that attach it directly to the receptacle. However, the receptacle is not usually removed during remodeling or redecorating because it is hard-wired into the building's electrical system. Consequently, the receptacle and sockets are often left exposed and the faces of the sockets become covered with paint splatters and the like. Subsequent paintings only make the problem worse. Reinstalling the cover plate then emphasizes the paint-splattered surface of the outlet, as the defaced socket surface is compared to the pristine surface of the cover plate.

Further, cover plates are conventionally not available in a variety of colors and textures to match different room décor. Users sometimes cover the cover plate with wallpaper or paint to match a room, but because the underlying receptacle socket faces are also made in standard colors, usually white and ivory, the mismatched socket faces and cover plates cause the outlets to be more conspicuous.

For outlet cover plates that have been designed to hide the socket face, each is designed for only a single configuration of outlet and, therefore, do not reduce the number of SKUs for a store. It would be advantageous to have a cover plate that is configured to be adapted to any of a plurality of different socket face configurations yet still hide the socket face.

BRIEF SUMMARY OF THE INVENTION

This invention provides a simple, easily-installed cover plate that hides the face of sockets by covering an electrical outlet, including the face of the sockets, but includes more than one outlet configuration for the cover plate. Embodiments of the present invention include a plurality of plug blade apertures for a plurality of different receptacle configurations, a front surface, one or more thinned regions on the front surface and a back surface that contacts the socket face. Other embodiments of the present invention include configuration for only a single receptacle.

In a simple form, embodiments of the present invention include a cover plate for an electrical outlet. The cover plate may include a plurality of plug blade apertures extending therethrough. Alternatively, or additionally, the cover plate may include at least a first configuration of break out elements identified thereon and at least a second configuration of break out elements identified thereon. The second configuration may be distinct from the first configuration for selectively placing one of the configurations in use by removing break out elements from within at least one of the configurations to provide through openings in the base. The first configuration may be identified on a first side of the base and the second configuration may be identified on a second side of the base opposite to the first side.

The first configuration may be a first of a plurality of configurations on the first side and the second configuration may be a first of a plurality of configurations on the second side. The configurations may include one or more of shapes for toggle, push and throw switch, and duplex, GFCI, decora, and round outlet configurations.

The configurations may include thinned portions forming outlines. The thinned portions may have a thickness that can be broken by a screw driver or an electrical component that is being connected to the outlet. In this regard, it is to be understood that the cover plate may initially include a cover plate that has one or more through openings in a first configuration for use without the need of preliminary modification that can be modified if desired for alternate configurations by opening other aperture punch out regions. Alternatively, the cover plate may be provided initially as a "blank" cover plate. That is, the cover plate may be devoid of through openings for accommodating electrical outlets. Then, the through openings may be selectively formed in the blank as desired by a user through appropriate aperture punch out regions.

The outlines for the first configuration may be provided by score lines, indentations, coloration or other form of marking that is disposed on a surface of the first side of the cover plate, and the outlines for the second configuration may be provided by similar manner on a surface of the second side of the cover plate.

The cover plate may include a wall having a general thickness in portions used to cover the socket face in a range from approximately twenty thousandths to approximately seventy-five thousandths of an inch, the wall having the first and second configurations identified thereon.

A method of selecting at least one of a plurality of configurations provided on a cover plate of an outlet cover may include removing material from within an identified portion of the base. The step of removing may include a step of breaking portions of the cover plate out of an identified area. The step of breaking portions of the cover plate out of the identified area may include breaking the portions out with a generally rigid object. The generally rigid object may be part of a pair of pliers or a screw driver. The step of breaking may include forcing the material in a first direction corresponding to a facing direction of the first side of the cover plate.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 1A is a front plan view of a base of an outlet cover for an electrical outlet in accordance with one embodiment of the present invention;

FIG. 1B is a back side plan view of the base shown in FIG. 1A;

FIG. 3 is a front plan view of a base of an outlet cover for an electrical outlet showing another embodiment having additional or alternative features in accordance with the present invention;

FIG. 4 is a front plan view of still another embodiment of a base of an outlet cover for an electrical outlet including additional or alternative features;

DESCRIPTION OF THE SEVERAL EMBODIMENTS

Figure 2:
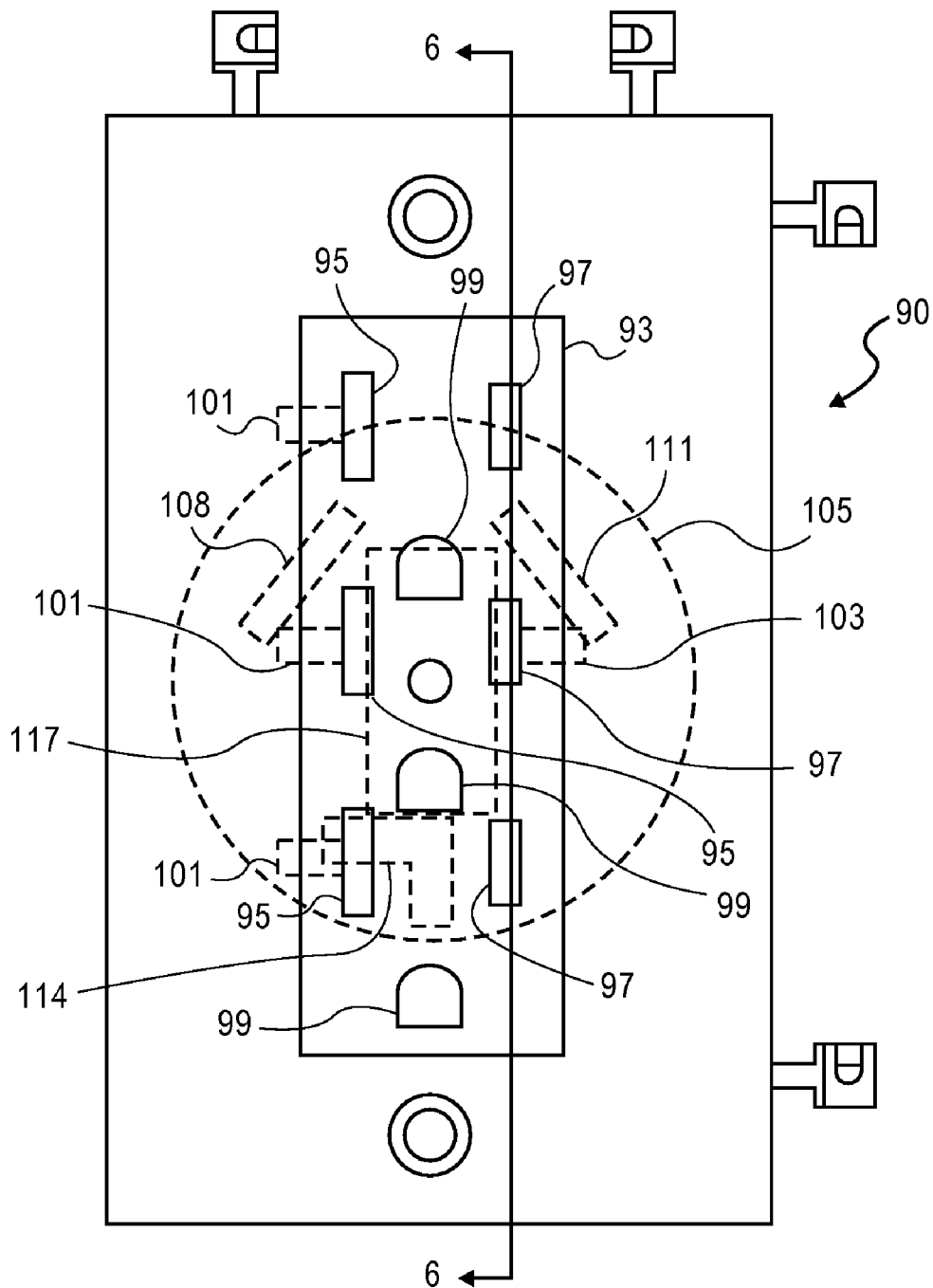
FIG. 2 is a front plan view of a base of an outlet cover for an electrical outlet in accordance with another embodiment of the present invention.

FIG. 1A is a front plan view of a cover plate 12 for an electrical outlet in accordance with a particular embodiment of the present invention. As used herein, the term "cover plate" is intended to comprise both cover plates with and without hinge members attached thereto. The term "base" refers to the subset of cover plates with hinge members coupled thereto and to which a lid may be coupled through mating hinge members coupled to the lid. While embodiments of the invention may include cover plates configured for use with or without a hinged cover, the figures and examples provided herein generally show embodiments for use with a hinged cover. It should be understood from the disclosure provided herein, however, that the principle of providing a cover for the socket face with its various configurations and embodiments described herein applies equally to cover plates with and without hinges associated. Furthermore, the teachings and specifics of the inventions described in U.S. Pat. No. 5,763,831, issued Jun. 9, 1998 to Shotey et al. and U.S. Pat. No. 6,723,922, issued Apr. 20, 2004 to Shotey et al. are relevant to the present disclosure for molding and manufacturing processes and details on the covers and hinges, and the references as a whole are incorporated herein by reference for their relevant factual information.

The base 12 of FIG. 1A includes a generally flat plate 15 of material for hiding the socket faces of an electrical outlet or receptacle. The base plate 15 may be configured to be mounted directly to an electrical outlet box. In cases where the base plate 15 hides the underlying outlet socket face, the base plate 15 may provide a covering that can advantageously change the appearance of the electrical outlet.

While the base plate 15 is generally flat, it may also have any number of a variety of contours including ridges or walls, hinges, and/or apertures for mating with an underlying socket face, receptacle or switch, or for decoration, for example. The hinge elements, if used, may provide a pivotal connection for attachment of a weather protective lid, for example. It is contemplated, however, that in some embodiments of the present invention, hinge elements will not be used, and that some embodiments of the present invention will simply be configured as conventional wall plates with no additional hinge features. See, for example, FIG. 5A. In embodiments where hinge elements are used to enable attachment of a lid, hinge styles other than those shown in the figures of the present invention may be substituted as is known in the art. The contours, if used, may protrude or depress from front surfaces, back surfaces, or edges of the base plate 15. However, the base plate 15 and its structure may all lie within a predetermined profile of maximum thickness in the front to back direction that forms the generally flat configuration. This thickness is much less than a height or width dimension of the base plate 15. Therefore, the base plate may be considered to be generally flat even when it includes structure that provides a contour or texture.

As may be appreciated, there are a large variety of electrical connectors and electrical switches having an equally large variety of configurations of electrical outlet and switch configurations. Thus, there is a need for a base plate 15 that is capable of modification to match a large variety of electrical outlets and switches. Furthermore, it is advantageous to provide the base plate 15 in an overlying relation with any of a variety of existing electrical outlet or switch configurations. The base plate 15 may also be configured in any manner to advantageously hide all or part of receptacle or switch configurations that have not yet been discovered.

The base plate 15 may have through openings, or plug blade apertures, defined by structure forming edges at 29, 32, 35, 38, 41, and 44. These through openings may be configured to receive prongs of a plug while the base plate provides a cover to hide a face of a plug receptacle. At least one additional configuration may be identified on the base plate 15 by grooves, score marks or ink marks 18, 21 to define the socket face regions 24 and 26. The socket face regions 24 and 26 may be removed from the base plate 15 to provide through openings in a manner described in U.S. Pat. No. 6,723,922, which is incorporated herein by reference.

Alternatively, the socket face regions 24 and 26 may be left to cover the socket face of an electrical outlet onto which the cover plate is installed, and aperture punch-out regions 29, 32, 35, 38, 41, and 44 may be removed to allow plug prongs to extend through the socket face regions 24 and 26. Material may be selectively removed from within the respective outlines formed by these grooves or score lines. As may be appreciated, the material may be removed from the identified areas individually or as a group. For example, a portion 47 of the material within groove 29 may be punctured by a screw driver or some other tool. Alternatively, material may be punctured at one of the portions 47, 49, and 51 simultaneously by the prongs of a plug, for example. To enable puncture of material from the portions 47, 49, and 51, the material in these portions may be made relatively thin compared to the surrounding material. In most cases it is desirable to have at least a portion of the material for the aperture punch out regions no greater than three fourths the maximum thickness of the surrounding material. However, it is believed that in some cases, depending upon the material, a simple score line may be used in the prong aperture regions that would allow the aperture punch out region to rupture when force is applied. The thinned area may be the entire aperture punch-out region, it may simply be the boarder of the aperture punch-out region, or it may be a score line within the aperture punch-out region that would allow an object, such as a plug, to puncture the region. In fact, these portions may comprise a thin film of a thickness less than or equal to the thickness of the base plate 15 at the grooves or score lines. Those of ordinary skill in the art are familiar with plastics and metals manufacturing methods and techniques whereby portions of a plastic or metal material may be made to be removed or punched out as needed for particular applications of the present invention.

As shown in FIG. 1A, examples of grooves, score lines or ink marks (collectively "indicators") on the front surface of the base plate 15 are shown in solid lines. Alternatively, a single score line could be used within the aperture punch out regions near the center to create a weakness in that region. Additional indicators may be provided on a back surface of the base plate 15 to provide for alternative removal of material to form through openings in any of a variety of additional configurations. The indicators on the back surface of the base plate 15 are shown in dashed lines in FIG. 1A. Accordingly, in FIG. 1A, a first alternative configuration is provided by a rectangular score line 54. A second alternative configuration is provided by a round score line 57. Additional alternative configurations are provided by circular score lines 60, 63, and 66. A further additional configuration may be provided by a rectangular score line 69 which may provide a through hole for a large switch or a protruding portion of an existing cover, for example. Alternatively, one or more of the openings may be formed as an initial aperture to assist in removing the other knock out elements. Further alternatively, one or more openings may be provided as an initial configuration, such as for a duplex outlet that exposes a front face of plug receptacle through the openings.

As may be appreciated, for the more common duplex outlet applications, corresponding configurations shown in solid lines in FIG. 1A may be used. To accomplish this, a user may selectively remove the socket face regions 24 and 26, or the aperture punch-out regions 47, 49, and 51 corresponding to the plug prongs. However, in applications having switches, round outlets, or cover structure corresponding to the configurations shown in the dashed lines in FIG. 1A, the base plate 15 may be turned over and material may be selectively removed according to the pattern on the second or back side (see FIG. 1B) to provide at least one through opening corresponding to a particular target application. For example, referring to FIG. 1B, a user may selectively remove a portion 72 of material within the groove forming the rectangular outline 54 to provide a through opening for a switch handle. Alternatively, a user may selectively remove any one of portions 75, 78, 81, and 84 formed by grooves 57, 60, 63, and 66 respectively. These grooves, 57, 60, 63, and 66 are configured to provide for removal of the corresponding portions 75, 78, 81, and 84 of material and thereby forming through holes for electrical sockets and the like having sizes that generally correspond to the circles formed by the grooves. Further alternatively, the user may selectively remove a portion 87 of the material bounded by the groove 69 of the base plate 15 to accommodate a structure of an existing cover in a through hole formed thereby.

FIG. 1B is a back side plan view of the base 12 of FIG. 1A. Hence the grooves shown in solid lines in FIG. 1A are shown in dashed lines in FIG. 1B and vice versa. As may be appreciated from FIGS. 1A and 1B, providing indicators on both front and back surfaces of the base plate 15 provides the advantage of enabling adaptation of the cover 12 to a larger variety of applications than if only a single side is used. As a practical matter, only a certain number of configurations can be provided on the front surface of the base plate 15. Placing indicators on a back surface advantageously enables generally double the number of configurations for which the base 12 may be adapted. Configurations for the front surface of the base plate 15 may be selected in accordance with their excepted frequency of application. For example, configurations that are used more frequently may be placed on the front of the base plate 15.

Alternatively, the configurations may be mixed and matched to provide the least amount of interference with each other. For example, if combining two particular configurations on the front surface tends to overly weaken the base plate and thus cause inadvertent breaking out of portions of material that are not intended to be broken out, then the two configurations may be advantageously separated and grooves be placed on opposite front and back sides of the base plate 15, respectively. It is to be noted both the front and back surfaces of the base plate 15 may be configured to provide an aesthetically appealing cover for an electrical outlet or switch. The indicators may be provided as minor indentations or markings so that the outline of non-selected configurations remaining on the base plate are relatively unnoticeable. On the other hand, the base 12 may be provided for outdoor use in which deeper grooves are considered to be of little or no consequence as far as aesthetics are concerned.

The material of the base plate 15 may comprise one or more of a metal, a plastic, or a composite. Depending upon the material, any of a variety of tools may be used to knock out portions of the material. Each of the portions of material may be divided into smaller portions or knock out elements for enabling incremental removal of the material corresponding to a particular configuration. Such smaller portions or knock out elements are taught in U.S. Pat. No. 6,723,922 that has been incorporated by reference.

While the knock out elements may be forced in either of a forward or rearward direction, removal is facilitated by forcing the knocked out elements in a direction away from the surface having the grooves that define the knock out elements. That is, there is greater structural strength locally on the non-grooved surface. Thus, a preferential strength advantage is provided in which removal of knock out elements of one configuration is facilitated over removal of knock out elements of another configuration. Thus, a user may selectively configure the base plate 15 by providing through holes in a predetermined configuration corresponding to particular indicators. The user may advantageously select a direction of force that will preferentially cause removal of a desired configuration that is identified. The user may also select a particular tool adapted to the particular material to be removed. Thus, a user may advantageously facilitate removal of particular knock out elements or aperture punch out regions in a particular portion corresponding to the desired configuration. Further advantageously, the user may alternatively select a configuration defined by the additional indicators on an opposite side of the base plate 15.

The distinction made between knock out elements and aperture punch out regions is dependant primarily upon the width of the aperture formed. For knock out elements, the regions are generally fairly large such that the socket face can show through. For aperture punch out regions, the width of the region is generally just larger than the width of the plug aperture and much smaller than a knock out region. Often, because the aperture punch out region is punctured by pushing against the region with a narrow object, the material may not be fully removed from the region and may remain attached with the aperture extending through it. For a knock out, the material is removed because its size is much larger and interferes. If the aperture is formed to allow for plug blade aperture openings by simply pressing against the region, it is referred to as an aperture punch out region. It is anticipated that the thickness of the aperture punch out region will generally be thinner than a knock out element, but this is not required for the embodiments disclosed herein provided the aperture punch out region is relatively easy to remove with an applied force. The GFCI button regions shown in FIG. 3 are, therefore, also referred to as aperture punch out regions because no socket face is exposed in removal of that material.

While the configurations shown and described with regard to FIGS. 1A and 1B may provide through openings adapted for use with duplex applications or switch apertures as described above, the groove 69 enabling knock out of portion 87 of material to form a large rectangular through opening may be sized to correspond to Decora configuration applications. The grooves or score lines outlining circular configurations may be configured to provide through openings for round electrical sockets of a variety of sizes, for example.

FIG. 2 is a front plan view of a base plate 90. This alternative configuration has a large rectangular outline that may be defined by a groove 93 and three plug receptacles, each including structure defining openings through the base plate 90 in a configuration shown by lines 95, 97, and 99. Thus, the three receptacles may provide existing through openings for receipt of plug prongs while the rest of the base plate 90 may act as a cover that hides a surface of the plug face. Alternatively, the base plate 90 may include aperture punch out regions in areas within the lines 95, 97, and 99. Grooves may be provided at lines 95, 97, and 99 to enable selective removal of three removable portions identified by lines 95, 97, and 99, or the regions may otherwise be thinned. The rectangular groove 93 and the plug receptacle regions defined by lines 95, 97, and 99 are shown in solid lines in FIG. 2 in order to indicate that the region identification, where used, is in the front surface of the base plate 90. Dashed lines 101 and 103 represent alternative or additional portions that may be originally open or provided as identified portions that may be punctured or removed using aperture punch out regions or knock out elements as appropriate. These portions together with the portions defined by lines 95 and 97 may be open or punctured in order to accommodate plug prongs of corresponding shapes and positions. Thus, the regions for providing through openings in the base plate 90 for the three plug receptacles may have alternative configurations.

The additional dashed lines 105, 108, 111, and 114 in FIG. 2 represent indicators on a back surface of the base plate 90 similar to those described with regard to FIGS. 1A and 1B above. For example, a groove 105 may be provided to enable breaking out of material to form a through opening for a round receptacle. Grooves 108 and 111 outlining generally diagonally disposed rectangular portions and a groove 114 outlining an "L" shaped portion may be provided to enable pucture of aperture punch out regions to accommodate an electrical connector of a similar shape. A groove 117 outlining a smaller rectangular portion may be provided in the back surface to enable breaking out and removal of material to form a through opening for a switch handle as described above. As also described above, the base plate 90 of FIG. 2 may be selectively turned over to enable a user to view the additional configurations indicated. Furthermore, providing such indications on an opposing side facilitates removal of knock out elements and puncture of aperture punch out regions to provide through openings corresponding to any of a variety of the additional configurations.

FIG. 3 is a front plan view of a base plate 120 having duplex or two plug receptacle configurations including through openings at 29, 32, 35, 38, 41, and 44. Thus, the base plate 120 may be used to cover a face of a plug receptacle, provide existing openings for receiving plug prongs, and provide for selective removal and puncture of portions corresponding to any of a variety of configurations that may be identified on the base plate 120. Alternatively, the openings at 29, 32, 35, 38, 41, and 44 may be replaced by aperture punch out regions of the base plate that may be identified by indicators substantially corresponding to the solid lines 29, 32, 35, 38, 41, and 44 of FIG. 3. These indicators are shown in solid lines indicating that they are disposed in the front surface of the base plate 120 similar to the configurations shown in FIGS. 1A and 1B. Indicators 123 and 126 may also be provided in the front surface to enable selective puncture of material through an aperture punch out to provide mounting apertures at respective longitudinal ends of the base plate 120.

An indicator 129 may be provided in a back surface to alternatively and selectively provide a mounting aperture in a center of the base plate 120. Indicator 132 may be provided in a back surface, for example, to identify selective removal of material circumscribed thereby to accommodate ground fault circuit intercept (GFCI) switches through knock out regions. The indicators 132 may be provided at respective longitudinal ends and a central portion of the base plate 120 to correspond with typical positions of GFCI switches on electrical outlets. Each of the indicators 132 may include dividing segments that define portions 135, 137, and 139 at each of the end and central positions. Thus, the user may selectively remove one or more of the portions 135, 137, and 139 depending upon the GFCI switches and their positions on an electrical outlet to be covered by the base plate 120. It is contemplated that other indicators, aperture punch out regions and/or knock out elements may also be provided to accommodate other configurations of GFCI switches or other outlet components or configurations.

FIG. 4 shows a base plate 142 having a groove 145 outlining a generally circular configuration. Indicators 148, 151, and 154 outline aperture punch out regions that may be ruptured or otherwise punctured to accommodate prongs of an electrical connector of a particular configuration. The groove 145 may be disposed on a front surface or a back surface as has been described above. Alternatively, the portions identified by indicators 148, 151, and 154 may be replaced by through openings. Thus, the base plate 142 may have existing openings with edges corresponding to the dashed lines at 148, 151, and 154 for receiving plug prongs.

Figure 5:
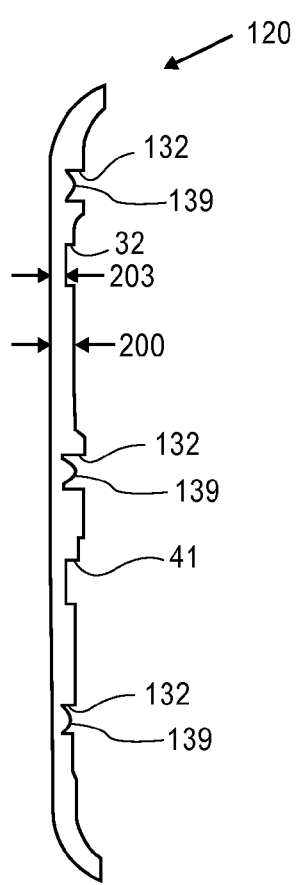
FIG. 5 is a first cross-sectional view of the cover plate of FIG. 3 taken along section line 5—5 for a modified embodiment where the cover plate is adaptable to a first electrical outlet configuration.
Figure 6:
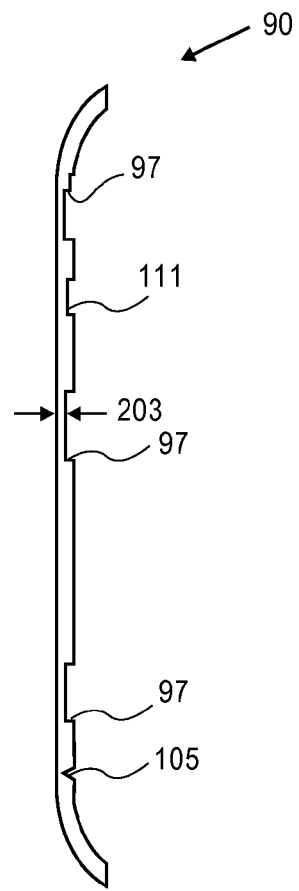
FIG. 6 is a second cross-sectional view of the cover plate of FIG. 2 taken along section line 6—6 for a modified embodiment where no hinge members are used and the cover plate is adaptable to at least two different electrical outlet configurations.
Figure 7:
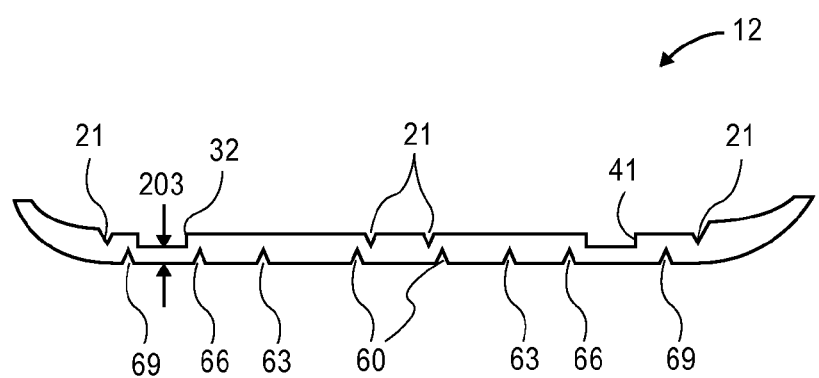
FIG. 7 is a cross-sectional view of the cover plate of FIG. 1B taken along section line 7—7 for a modified embodiment where no hinge members are used.

FIGS. 5, 6 and 7 are, respectively, cross-sectional views of FIGS. 3, 2 and 1B and use the respective reference numbers corresponding to the description of those FIGs. Additionally, thicknesses 200 and 203 are shown for each embodiment. While it is not required for every embodiment, in particular embodiments of the invention, the thickness of the socket face region, or region of the cover plate directly covering the insulative socket face of an electrical outlet, has a thickness 200 that does not exceed a predetermined thickness. In one specific embodiment, that thickness 200 is between 0.020–0.075 inches. The thickness 200 may be of various shapes and sizes, so long as the thickness 200 does not exceed a predetermined maximum thickness. The thickness of the socket face region of the cover plate is important because it is the region through which plug blades are inserted and provides the point of electrical contact for a corded plug in the electrical outlet. It has been determined by the National Electric Code that material over the socket face may increase the risk of fire and heating. Subsequent studies have shown that defining a maximum thickness for the socket face region of a cover plate ensures that the plug blades will be inserted deeper into the plug blade apertures of the receptacle despite the insulative plug cover layer extending over the socket face. It has been determined that a maximum thickness of 0.075 inches maintains sufficient plug blade contact within the receptacle while allowing sufficient material strength for the outlet cover.

Exemplary embodiments of the present invention have the thickness 200 within the range of not more than 0.075 inches. It has been found that the conventional thickness of 0.080 inches and larger causes concern among some that sufficient contact will not be made by the plug prongs into the socket. Reduction of the thickness 200 to less than 0.075 inches, and more particularly to a range of 0.020–0.075 inches, permits the plug prongs to extend more fully into the socket, relieving many of those concerns. In particular embodiments of the present invention, a thickness of 0.020 inches may be achieved by use of particular materials, such as, but not limited to, polypropylene and polyethylene. In other particular embodiments, the thickness of 0.020 inches may also be accomplished by use of a vacuum used during the material flow process. As the vacuum evacuates the air within a mold used to form a cover plate, the material forming the cover plate may more easily be drawn into all cavities of the mold. To maximize the strength of the covering surface while minimizing the thickness 200, it has been found that a thickness between 0.030 inches and 0.055 inches reduces the likelihood of structural failure while maintaining the ability to achieve sufficient contact of the plug prongs within the socket. To maximize the contact made by the plug prongs into the socket, it has been found that a thickness within the range of 0.035–0.045 inches provides a substantially maximum contact between the plug prongs and the socket for a covered socket face while providing adequate strength of the covering surface. It will be understood by those of ordinary skill in the art that the ranges of thickness disclosed are for the exemplary purposes of this disclosure and that the present invention is not limited to these ranges.

In particular embodiments of the present invention, the thickness 200 may be accomplished by recessing or reducing the thickness from the back surface of the cover plate. This enables the front surface of the cover plate to not extend beyond the plane defined in part by the one or more thinned regions of the front surface that extends parallel to the cover plate. This vertical plane sets the boundary for which portions of the cover plate should not extend past, allowing for unobstructed insertion of plug blades into the receptacle through the cover plate. While portions of the front face may not extend beyond the vertical plane, they may extend backward.

The aperture punch out region material may be configured to be so thin as to be ruptured even simply by insertion of the prongs of an electrical plug. The thickness 203 needed for the aperture punch out regions depends upon a number of features including, but not limited to, the material used to form the cover plate, the ruggedness desired for the punch out region, the ease with which the punch out region should be able to be punched out, the thickness of the surrounding material, and the tolerable amount of sagging for the region. Preferably, the thickness 203 of the aperture punch out regions is generally less than or equal to approximately three fourths of the thickness 200 of the surrounding socket face regions. It has been found that when using polyvinylchloride ("PVC"), and a cover plate having a socket face region with a maximum thickness of between 0.035 to 0.075 inches, an aperture punch out region having a thickness of less than approximately 0.030 inches is best. This allows for a sufficient difference between the strength of the punch out region and the strength of the socket face region to allow the punch out region to be ruptured by pressure on the region such as by a plug prong. The specific manner of establishing the thickness, whether through molding or scoring or groove, depends upon the other factors mentioned above. As shown in FIG. 5, only a portion of the aperture punch out region, such as a groove around the perimeter of the region or somewhere within the region, needs to be the minimum level to allow for puncture of the region.

The thin film of material used for the aperture punch out regions may be made to correspond to substantially all of a particular portion and may be advantageously made to correspond with cross sectional shapes and positions of prongs of plugs as illustrated in FIGS. 1A–7. Furthermore, this teaching may be applied to other known plug prong configurations, as well as to those which have not yet been discovered. It is also to be understood that the configurations shown in solid and dashed lines in FIGS. 1A through 7 may be mixed and matched in any variety of combinations without departing from the spirit and scope of the present invention. Furthermore, the various configurations may be located at alternative positions on the base plate without departing from the scope of the invention. For example, indicators identifying portions to be punched out for GFCI switches may be located at any position on the base plate that would correspond to GFCI switches of a predetermined configuration. Other configurations including configurations to accommodate other plug types may be provided. Additional combinations of configurations including combinations of multiple plug types may be provided in the same base plate.

While the knock out region outlines in the FIGs. have been described in terms of permanently removable portions, it is to be understood that one or more portions of the base plates 15, 90, 120, and 142 may be provided as replaceable portions, and the replaceable portions may themselves have indicators such as grooves, ink markings, score lines, or additional replaceable portions. For example, replaceable portions may be provided by adapter plates as taught by the disclosure of U.S. Pat. No. 6,642,453, issued Nov. 4, 2003 to Shotey et al. and entitled "CONVERTIBLE ELECTRICAL DEVICE COVER AND METHOD FOR INSTALLING THE SAME", which is incorporated herein by reference.

Figure 8:
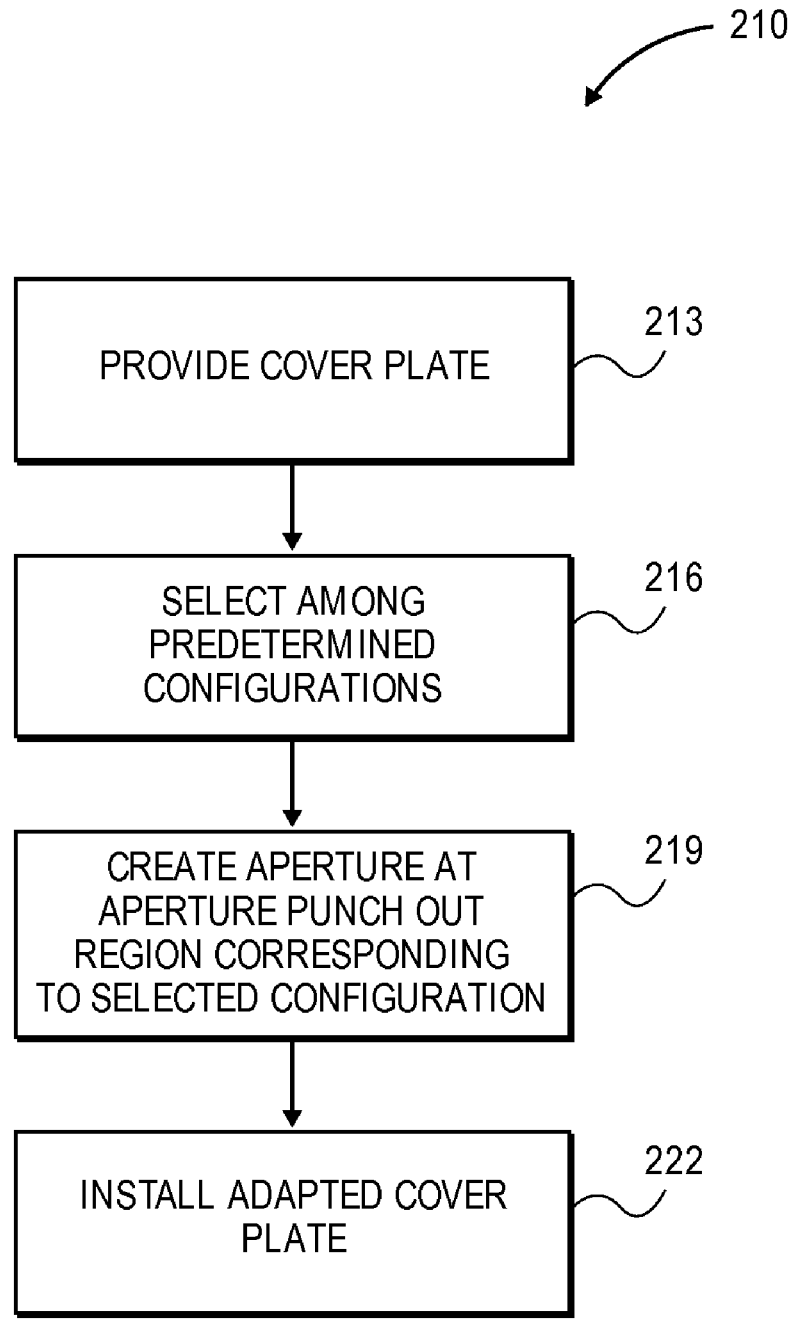
FIG. 8 is a flow diagram of a method of installing a cover plate for use with an electrical outlet.

FIG. 8 is a flow diagram for a method 210 of installing a cover plate to a predetermined electrical outlet configuration. The method begins by providing a cover plate such as that described above in embodiments adaptable to more than one possible electrical outlet configuration (Step 213). The installer then selects among the predetermined configurations available on the cover plate (Step 216). As described in association with the various embodiments above, the configurations may be indicated on one side or both the front and back sides of the cover plate. Once the installer has selected a desired configuration, the installer creates an aperture at the aperture punch out regions corresponding to the selected configuration (Step 219). Creating an aperture, as explained previously, may be done by rupturing the thin film of material within the aperture punch out regions with a screw driver or with plug prongs. Last, the installer installs the cover plate onto an electrical outlet (Step 222). Installation may involve many steps such as attachment of a lid and mounting on the outlet box as well as other conventional installation steps.

Another advantage of using a cover plate where the plug blade apertures are covered prior to use is that the cover plate, if provided with an appropriate textured surface for painting, could be painted while on the outlet cover without concern of paint getting inside the electrical outlet. Also, in locations where particular outlets are never used, the outlet remains covered and unexposed. Once the outlet is needed, the user need only press the plug through the aperture punch out regions indicated on the surface to puncture the regions and access the receptacle.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the invention.

The invention claimed is:

1. A cover plate for an electrical outlet, the cover plate comprising:
    at least one socket face region having a front surface and a back surface, the socket face region configured to cover at least one insulative socket face of an electrical outlet when the cover plate is installed on the electrical outlet, the insulative socket face having a plurality of plug blade apertures extending therethrough, wherein the back surface contacts the at least one socket face when the cover plate is installed on the electrical outlet, the socket face region having a first thickness between the front surface and the back surface; and
    a plurality of cover plug blade apertures within the at least one socket face region, the cover plug blade apertures arranged and configured to correspond to positions of the plurality of plug blade apertures through the insulative socket faces for each of at least two different insulative socket face configurations selected from the group consisting of a single round electrical outlet, a duplex electrical outlet and a ground-fault circuit interrupt electrical outlet.

2. The cover plate of claim 1, wherein the first thickness is less than or equal to about 0.075 inches.

3. The cover plate of claim 1, wherein the first thickness is less than or equal to about 0.055 inches.

4. The cover plate of claim 1, wherein the first thickness is less than or equal to about 0.045 inches.

5. The cover plate of claim 1, wherein the cover plug blade apertures are arranged and configured to correspond to positions of the plurality of plug blade apertures for each of a single round electrical outlet, a duplex electrical outlet and a ground-fault circuit interrupt electrical outlet.

6. The cover plate of claim 1, further comprising a plurality of indicators on the front surface of the socket face region, the indicators identifying approximate boundaries of features of the insulative socket faces for which the cover plug blade apertures correspond.

7. The cover plate of claim 6, wherein the indicators comprise ink.

8. The cover plate of claim 6, wherein the indicators comprise at least one groove in at least one of the front and the back surface of the at least one socket face region.

9. The cover plate of claim 1, further comprising at least one hinge member on the cover plate.

10. The cover plate of claim 9, further comprising at least one lid hingedly attached to the cover plate.

11. The cover plate of claim 1, further comprising at least one hinge member on each of two adjacent sides of the cover plate.

12. The cover plate of claim 1, the cover plate comprising a first side and a second side, the first side comprising at least a first socket face region corresponding to a first insulative socket face configuration and the second side comprising at least a second socket face region corresponding to a second insulative socket face configuration different than the first insulative socket face configuration.

13. The cover plate of claim 1, wherein a ground fault circuit interrupt electrical outlet is one of the at least two different electrical outlet configurations, the cover plate further comprising at least one knock out region arranged and configured to correspond to a position of a ground fault circuit interrupt electrical outlet switch.

14. A cover plate for an electrical outlet, the cover plate comprising: at least one socket face region having a front surface and a back surface, the socket face region configured to cover at least one insulative socket face of an electrical outlet when the cover plate is installed on the electrical outlet, wherein the socket face region having a first thickness between the front surface and the back surface; and a plurality of cover plug blade apertures within the at least one socket face region, each cover plug blade aperture associated with a predetermined electrical outlet configuration, wherein the plurality of cover plug blade apertures are configured to align with electrical outlet configurations for each of at least two different electrical outlet configurations selected from the group consisting of a single round electrical outlet, a duplex electrical outlet and a ground-fault circuit interrupt electrical outlet.

15. The cover plate of claim 14, wherein the first thickness is less than or equal to about 0.075 inches.

16. The cover plate of claim 14, wherein the first thickness is less than or equal to about 0.045 inches.

17. The cover plate of claim 14, wherein the cover plug blade apertures configured to align with electrical outlet configurations for each of a single round electrical outlet, a duplex electrical outlet and a ground-fault circuit interrupt electrical outlet.

18. The cover plate of claim 14, further comprising a plurality of indicators on the front surface of the socket face region, the indicators identifying approximate boundaries of features of the insulative socket faces for which the cover plug blade apertures correspond.

19. The cover plate of claim 14, the cover plate comprising a first side and a second side, the first side comprising at least a first socket face region corresponding to a first electrical outlet configuration and the second side comprising at least a second socket face region corresponding to a second electrical outlet configuration different than the first outlet configuration.

20. The cover plate of claim 14, wherein a ground fault circuit interrupt electrical outlet is one of the at least two different electrical outlet configurations, the cover plate further comprising at least one knock out region arranged and configured to correspond to a position of a ground fault circuit interrupt electrical outlet switch.

\* \* \* \* \*